United States Patent [19]

Maisack et al.

[11] 3,875,155
[45] Apr. 1, 1975

[54] PROCESS FOR MAKING SALTS OF 3-ISOPROPYL-2,1,3-BENZOTHIADIAZIN-(4)-ONE-2,2-DIOXIDE

[75] Inventors: Herbert Maisack, Ludwigshafen; Albrecht Mueller, Frankenthal; Helmut Romberg, Ludwigshafen, all of Germany

[73] Assignee: BASF Aktiegesellschaft, Ludwigshafen/Rhine, Germany

[22] Filed: Mar. 4, 1974

[21] Appl. No.: 447,918

[30] Foreign Application Priority Data
Mar. 31, 1973 Germany............................ 2316292

[52] U.S. Cl................................. 260/243 R, 71/91
[51] Int. Cl........................................... C07D 93/30

[58] Field of Search................................ 260/243 R

[56] References Cited
UNITED STATES PATENTS
3,041,336  6/1962  Teufel................................ 260/243
3,822,257  7/1974  Hamprecht et al................. 260/243

*Primary Examiner*—John M. Ford
*Attorney, Agent, or Firm*—Johnston, Keil, Thompson & Shurtleff

[57] ABSTRACT

Method for making an aqueous solution of substantially pure salts of 3-isopropyl-2,1,3-benzothiadiazin-(4)-one-2,2-dioxide from a solution of this compound in an organic solvent.

2 Claims, No Drawings

PROCESS FOR MAKING SALTS OF 3-ISOPROPYL-2,1,3-BENZOTHIADIAZIN-(4)-ONE-2,2-DIOXIDE

The present invention relates to a process for making an aqueous solution of substantially pure salts of 3-isopropyl-2,1,3-benzothiadiazin-(4)-one-2,2-dioxide (I) from a solution of the crude substance in an organic solvent.

It is known to use 3-isopropyl-2,1,3-benzothiadiazin-(4)-one-2,2-dioxide (hereinafter called "bentazone") and its salts as herbicidal ingredients. Aqueous solutions of these salts can be made from a solution of the crude bentazone in an organic solvent by extraction with an aqueous solution of sodium hydroxide. The resulting aqueous solution of the sodium salt of bentazone is acidified with sulfuric acid. After separating the precipitated bentazone it is washed until free from acid and then dried. The dry bentazone is then dissolved in an aqueous solution of the alkaline hydroxy compound corresponding to the desired salt.

This process has the disadvantage of being very costly and the effluent liquid being contaminated with the large quantities of sodium sulfate produced in precipitating the bentazone. Yet, purification of the crude bentazone is unavoidable because the solution of the crude bentazone in an organic solvent contains, besides the bentazone, an equimolar quantity of dimethylcyclohexylamine hydrochloride and also certain quantities of byproducts from their manufacture or deriving from the starting materials.

Consequently when the solution of the crude bentazone in an organic solvent is extracted with an aqueous solution of sodium hydroxide the resulting aqueous solution contains not only the desired salt of benzatone but also the entire undesired chlorides and all the extracted byproducts. Due to the contaminating salts the solutions obtained in this way are quite unsuitable for use directly as herbicides. Although the bentazone can be precipitated, together with the impurities, by acidifying the solution, as described above, the method suffers from the disadvantages mentioned above.

We have now found that an aqueous solution of substantially pure salts of 3-isopropyl-2,1,3-benzothiadiazin-(4)-one-2,2-dioxide can be obtained from a solution of the crude compound in an organic solvent by first of all extracting the organic solution in a first process stage with water at a pH of 2 to 2.5 and then extracting the residual organic solution, in a second process stage, with an alkaline aqueous solution.

The desired salts are the alkali metal salts and alkaline earth metal salts of bentazone and also the salts of organic amines of bentazone.

As organic solvents there can for example be used chlorobenzene, dichlorobenzene, dichloroethane, trichloroethane, carbon tetrachloride or other chemically stable solvents.

The process of the present invention can be conducted either as a batch process or as a continuous process.

The first and second stages can each be subdivided into a plurality of separate zones.

The process of the invention is conducted at ambient temperature (20°C) or at a slightly elevated temperature, for example 30° to 45°C.

The second extraction stage is operated using an alkaline aqueous solution with a pH, for example, between 8 and 12. As alkaline compounds for this stage there can be used, for example, sodium hydroxide, potassium hydroxide, calcium hydroxide, dimethylamine, diethanolamine, diethylamine or other aliphatic or aromatic primary, secondary and tertiary amines.

EXAMPLE 1

A solution of crude bentazone in chlorobenzene (containing 20 to 25 percent by weight of bentazone) was continuously run into a stirred vessel and extracted at a temperature between 30° and 45°C with a dilute aqueous solution of sodium hydroxide at pH 2.5. The resulting phase mixture was allowed to overflow into a phase-separating vessel. The upper, aqueous phase (containing the water-soluble impurities and the impurities made water-soluble by hydrolysis) was run into a stirred vessel (A). The lower, organic phase, containing bentazone and monochlorobenzene, was led into another stirred vessel and washed at 30° to 40°C with water at a pH of 2, in order to remove completely the water-soluble impurities. The resulting phase mixture was led into a phase-separating vessel and the aqueous and organic phases were separated.

The aqueous phase was run into stirred vessel (A) mentioned above for further processing.

The purified organic phase was led into a further stirred vessel and extracted with an alkaline aqueous solution, the resulting aqueous solution containing the salts of bentazone having a pH between 8 and 12.

The resulting phase mixture was led into a further phase-separating vessel. The upper, organic phase was led, in order to extract the bentazone completely, into a further stirred vessel and extracted with a dilute aqueous solution of sodium hydroxide. The resulting phase mixture was separated into its two phases in a further phase-separating vessel (B). The upper, organic phase was added to the two aqueous phases contained in vessel (A), the resulting mixture being stirred in the presence of aqueous sodium hydroxide at a pH of 12. This splits the dimethylcyclohexylamine hydrochloride into NaCl and free amine. The amine is dissolved in chlorobenzene, the two phases being separated in a phase-separating vessel. The upper phase (chlorobenzene + amine) is processed by distillation. The components of the mixture can be used in the synthesis of further bentazone. The aqueous phase is run to waste.

The aqueous solution of bentazone salts contains the desired salt in the desired concentration, which can be adjusted by adjusting the concentrations of the aqueous solutions used in the second extraction stage. No subsequent concentration or dilution of the product solution is therefore necessary.

The product solution obtained in this way can be used as it is or after dilution as a herbicide, or it can be mixed with other herbicidal ingredients to form a herbicidal composition.

The pH values mentioned above must be strictly adhered to, particularly in the first extraction stage. At a higher pH the amine hydrochloride splits up into free amine and NaCl. The free amine would remain in the organic solution and contaminate the product bentazone salt solution. An excessively high pH also increases the solubility of bentazone in the aqueous phase, reducing the yield of the process.

On the other hand, if the pH is too low (in the acid range) the bentazone and its byproducts crystallize out in both phases of the mixture, resulting in process disturbances and reduced yields.

A pure solid bentazone can be obtained from the aqueous solution of its salts by precipitating in the known way with acids.

Compared to the known process the process of the present invention provides the following advantages:

1. Elimination of the precipitation process. This reduces the consumption of sodium hydroxide and sulfuric acid, which would otherwise be consumed at a rate of approximately 1.1 moles per mole of bentazone. Energy and time are also saved.
2. Less $Na_2SO_4$ and $NaHSO_4$ are produced as by-products. These substances would otherwise be produced at a rate of approximately 1.1 to 1.2 moles per mole of bentazone (protection of the environment).
3. It was especially surprising that a product of higher purity was obtained by extracting the byproducts. A final product of high and constant purity is ensured even if the raw material contains a large fraction of byproducts. This is very important if the product is intended for use as a plant protection agent.
4. The bentazone yield is higher because none is lost to the wash water after precipitation. Bentazone has a solubility of approximately 0.2 percent in water.

The following Examples illustrate the effectiveness of the new process.

EXAMPLE 2

Comparison between yields

Experiment *a*

From 1,000 g of crude solution there were obtained 208 g of bentazone by precipitation (known process).

Experiment *b*

From 1,000 g of crude solution of the same quality as used in Experiment a there were obtained 218 g of bentazone in the form of the sodium salt, calculated as bentazone (process of the present invention).

Experiment *c*

From 1,000 g of another crude solution there were obtained 201 g of bentazone by precipitation (known process).

Experiment *d*

From 1,000 g of crude solution of the same quality as used in Experiment c there were obtained 209 g of bentazone as the diethanolamine salt, calculated as bentazone (process of the present invention).

EXAMPLE 3

Purity of bentazone

Two samples (Sample *a* and Sample *b*) were taken from each of four different crude solutions (I to IV). In each case the two samples were subjected to different treatments, as follows:

1. Sample *a*

The crude solution was extracted with aqueous sodium hydroxide solution at a pH between 12 and 12.5. The alkaline extract solution was acidified and the precipitate dried and analyzed (known process).

2. Sample *b*

The crude solution in chlorobenzene was extracted three times:

1. Extraction with dilute sodium hydroxide solution at a pH of 2.5.
2. Extraction with water at a pH of 2.0 to 2.5.
3. Extraction with sodium hydroxide solution. The resulting sodium-bentazone extract solution was acidified and the precipitate dried and analyzed (process of the present invention).

RESULTS OF ANALYSIS

| Crude solution | I | | II | | III | | IV | |
|---|---|---|---|---|---|---|---|---|
| Sample | a | b | a | b | a | b | a | b |
| Bentazone % by weight | 81.1 | 86.5 | 81.8 | 91.0 | 84.3 | 90.5 | 82.3 | 90.4 |
| Organic impurities % by weight | 14.8 | 7.0 | 8.7 | 5.1 | 6.5 | 4.5 | 11.0 | 5.8 |

We claim:

1. A process for making an aqueous solution of substantially pure salts of 3-isopropyl-2,1,3-benzothiadiazin-(4)-one-2,2-dioxide from a solution of the crude compound in an organic solvent, wherein the organic solution is extracted, in a first process stage, with water at a pH of 2 to 2.5 and then, in a second process stage, with an alkaline aqueous solution.

2. A process for making substantially pure 3-isopropyl-2,1,3-benzothiadiazin-(4)-one-2,2-dioxide, wherein the aqueous solution obtained as claimed in claim 1 is acidified to precipitate the desired product.

* * * * *